Aug. 8, 1933.  C. MOTT ET AL  1,921,632
PRESSURE REGULATOR
Filed Oct. 26, 1927  3 Sheets-Sheet 1

INVENTORS:
CHESTER MOTT
GERALD G. SPENCER.
BY
Ford W. Harris
ATTORNEY.

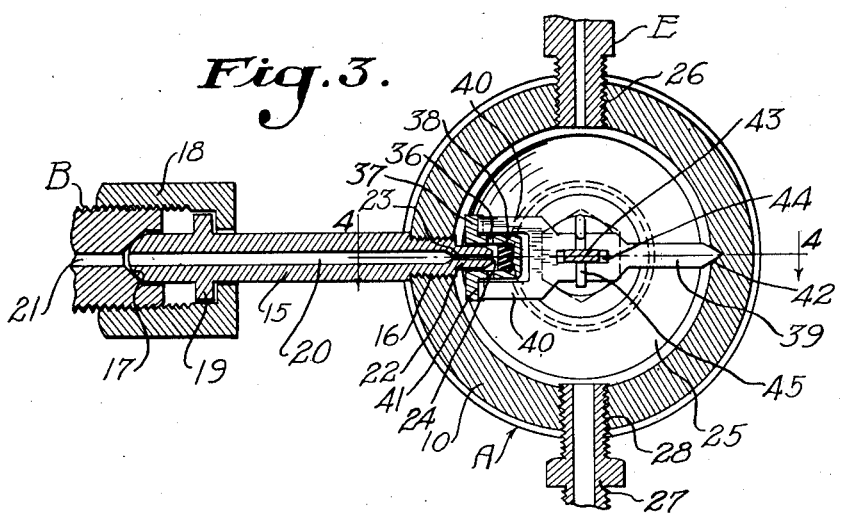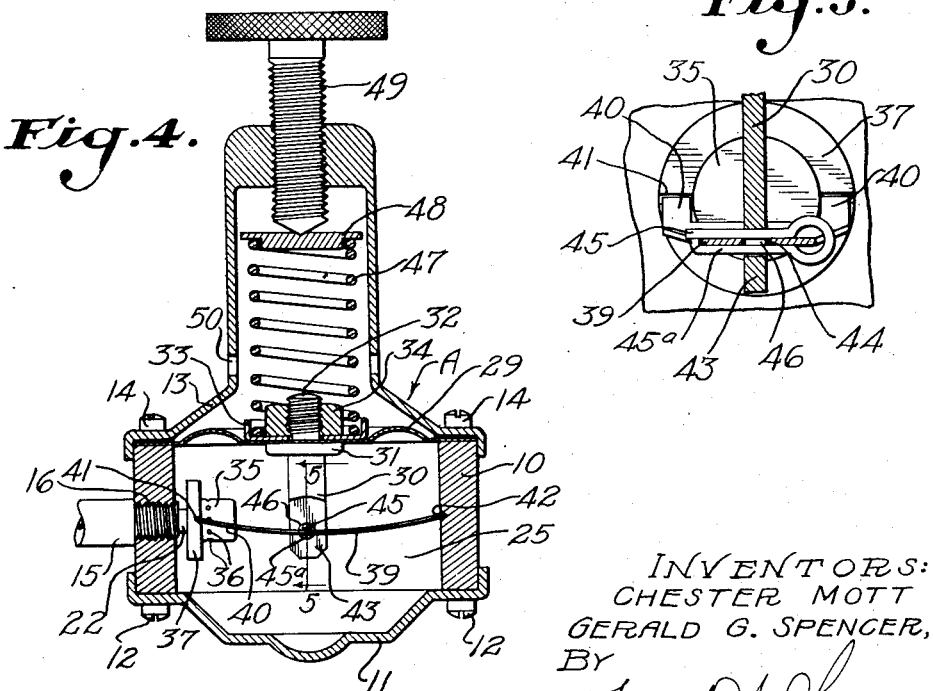

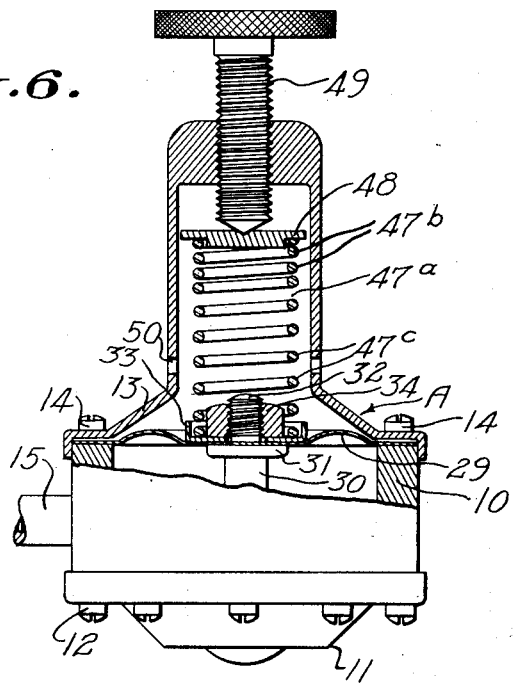
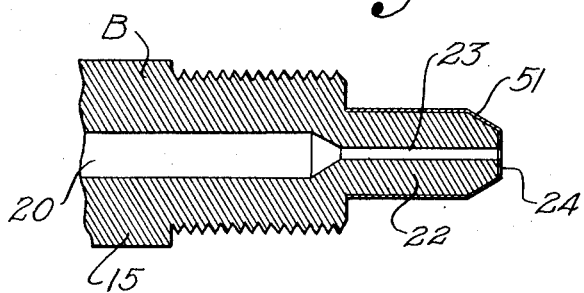

Patented Aug. 8, 1933

1,921,632

UNITED STATES PATENT OFFICE 1,921,632

PRESSURE REGULATOR

Chester Mott, Denver, Colo., and Gerald G. Spencer, Los Angeles, Calif., assignors, by mesne assignments, to Union Carbide and Carbon Research Laboratories, Inc., a Corporation of New York Application October 26, 1927. Serial No. 228,815

13 Claims. (Cl. 50—26)

This invention relates to pressure regulators and is more particularly directed to that general type of device usually employed for regulating the discharge of compressed gas or air from tanks or containers, to a proper pressure for use in torches or other apparatus.

In the art of welding or cutting with torches, a regulator of this general character is incorporated in the flow line leading from the tank or gas cylinder to the torch, and functions to reduce the pressure of the gas fed to said flow line from commercial oxygen, hydrogen, acetylene, or other compresed gas cylinders, to a predetermined proper pressure for the most effective operation of said torch, and to maintain such predetermined pressure in the flow line.

For the proper operation of a torch, it is necessary that the pressure on the torch (the delivery pressure of the regulator) shall vary, if at all, only within very close limits, otherwise it is necessary for the operator to make compensating adjustments of the needle valves of the torch, which is not desirable. Welding is best accomplished with a neutral flame and only a very slight change in the pressure delivered by the regulator will cause the flame to become carbonizing or oxidizing, for the neutrality of the flame is one of the most sensitive indicators of the proportion of oxygen to acetylene, for instance. It is therefore very desirable that the regulator be exceptionally sensitive to pressure influences so as to be very promptly responsive to pressure changes in the flow line.

In the conventional type of regulator, the desired sensitiveness of operation cannot be obtained without creating other conditions which are exceptionally undesirable.

The conventional type of regulator referred to has a chamber containing a stationary discharge nozzle and a diaphragm to which is attached a valve seat urged to closing position against said nozzle by a valve spring, there being a regulating spring acting against the diaphragm in opposition to the valve spring and the pressure within the chamber, said nozzle, seat, diaphragm, and opposed springs all being axially aligned. It is usually found that such regulators, under certain pressure and flow conditions, are inclined to sing or chatter. This is believed to be due to sympathetic vibrations set up in the diaphragm under a balanced condition of opposed forces and initiated by the movement of the valve seat with respect to the nozzle. Often these vibrations become very severe and will cause the pressure to fluctuate as much as one pound or more.

Under such conditions it is impossible to maintain the proper feed of gas to the torch and this fact is recognized by most manufacturers who attempt to overcome such vibrating or singing of the diaphragm by introducing a slight frictional drag on the moving parts of the regulator so as to damp out these vibrations. Obviously, such frictional drag reduces the sensitiveness of the device so that it will not respond promptly to changed conditions, as for instance considering the regulator as properly adjusted to produce at the torch the desired neutral flame for welding and that something happens to interrupt the gas flow, such as a popping or turning off of the torch or an obstructing of the flow line. In such event the diaphragm functions to force the seat to the nozzle to close off the gas flow. When the torch is again open the frictional drag, which was incorporated in the regulator to prevent excessive vibration of the daiphragm, also prevents the valve seat from opening promptly to its precise former position and the flame will show the undesirable oxidizing or carbonizing characteristics above referred to.

Another expedient heretofore employed in the manufacture of the ordinary type of regulator for increasing its sensitiveness has been to increase the throw of the diaphragm relative to that of the valve by a system of levers so that the force available at the diaphragm is multiplied several times in its transmission to the valve. It has been found that such lever systems cannot be made to operate with the desired freedom and that they engender too much lost motion, especially when slightly worn.

It is also well recognized that the sensitiveness of a regulator is seriously affected by any influence tending to cock the diaphragm and it is for this reason that the operating parts of the ordinary regulators are axially aligned as heretofore explained. It is believed that such alignment of counteracting forces is one of the causes of the undesirable chattering or singing of the diaphragm.

It is therefore an object of the present invention to provide a pressure regulator which is exceptionally sensitive to minute pressure changes in the flow line, and which at the same time is not susceptible to vibratory influences of a sufficient degree to cause such chattering or singing of the diaphragm as would produce an appreciable fluctuation in the pressure of the delivered gas.

Another object is to provide a pressure regulator in which the moving parts are substantially free from frictional drag.

Another object is to provide a pressure regulator in which the movement of the control valve is at right angles to that of the diaphragm.

Another object is to provide an operating mechanism by which the force transmitted from the diaphragm to the valve is multiplied through a means which is self-centering in relation to the diaphragm.

A further object of our invention is to provide a pressure regulator in which the motion of the diaphragm is transmitted to the valve by means of a toggle, which is straightened in order to close the valve and in which the force applied to the valve increases as it moves towards closed position.

A still further object of the invention is to provide a pressure regulator in which the toggle is formed from a toggle spring which is bowed so as to yieldably hold the valve against its seat.

A still further and very important object of the invention is to provide a pressure regulator of the character mentioned in which the operation of the toggle is controlled by a diaphragm or other pressure responsive means and an operating spring or other pressure applying means which acts upon the diaphragm.

A further object is to provide a valve which is entirely supported and guided in its movement by the valve nozzle.

It is desirable that the valve slide upon said nozzle with exceptional freedom and also that the nozzle be of such character as to resist wear, especially at its end portion which constitutes the valve seat and which will be subjected to the cutting action of any rust or scale entrained in the gas. It is therefore another object to plate said nozzle with a hard material, such as chromium, to provide a hard smooth wear resisting surface.

There have been many attempts to make welding and cutting regulators, most of which have failed because of the necessity to have great sensitiveness over the welding range, say, up to 12 or 15 pounds pressure, and also great capacity at cutting pressures, say, from 25 to 150 pounds pressure. One manner heretofore proposed to accomplish this was to provide two regulating springs, one relatively weak spring to cover the welding range and a stronger spring to cover the cutting range, the stronger spring being inoperative during welding.

As a matter of economy, it is a further object of the present invention to provide a single spring of compound pitch to serve throughout both the welding and the cutting pressure ranges.

Various other objects and advantages will be more fully apparent from the following description of the accompanying drawings which form a part of this disclosure, and which illustrate a preferred form of embodiment of the invention. Of the drawings:

Fig. 3 is an enlarged section taken on the line 3—3 of Fig. 2.

Fig. 4 is a section taken on the line 4—4 of Fig. 3.

Fig. 5 is an enlarged detail section taken on the line 5—5 of Fig. 4.

Fig. 6 is an elevation, partly in section, showing a modified form of adjusting spring.

Fig. 7 is an enlarged detail section of the regulator nozzle.

Figure 1:
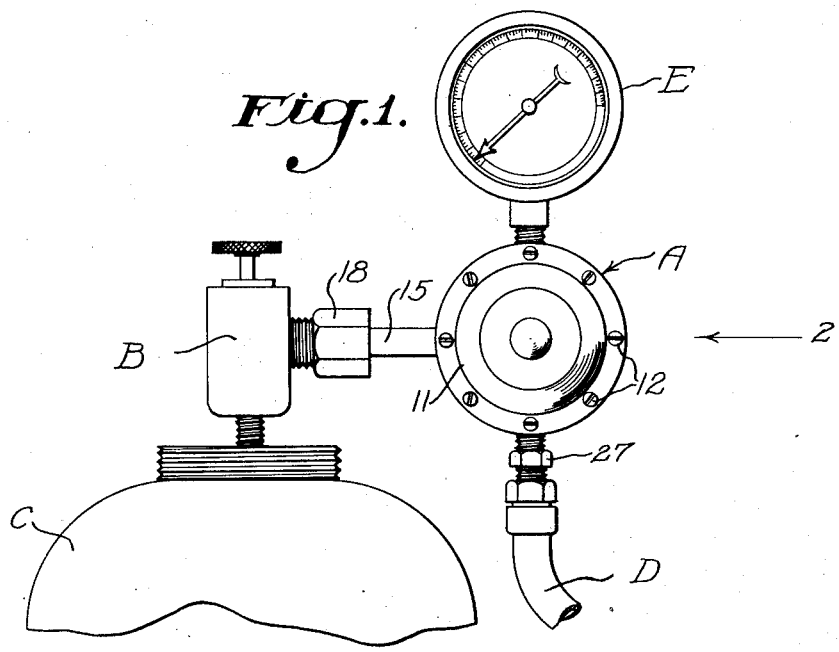
Fig. 1 is an elevation of the regulator of the present invention as installed for use in connection with an ordinary type of compressed gas cylinder.
Figure 2:
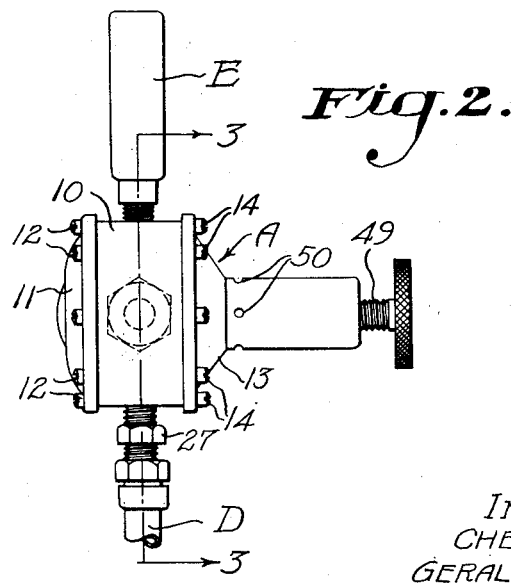
Fig. 2 is an elevation viewed in the direction of the arrow 2 in Fig. 1.

Referring particularly to Fig. 1, the regulator A is supported by and is connected to the usual valve body B with which the ordinary compressed gas cylinder C is equipped, and is connected to a flow line D leading to the torch or other apparatus using the gas.

In the preferred construction, the body of the regulator comprises an annular body member 10, one end of which is closed by a plate 11 secured thereto by screws 12, and a bonnet 13 secured to the opposite end by screws 14. The regulator is supported by a nozzle tube 15, one end of which is screw-threaded into the body member 10, as indicated at 16, the opposite end being formed to seat into a recess 17 provided in the valve body B and of suitable shape to insure a tight joint when the nozzle tube is drawn tight by a collar 18 which engages an annular shoulder 19 on said tube and has a screw-threaded engagement on the valve body B, (see Fig. 3). The bore 20 of this tube communicates with the gas passage 21 of the valve body B and its end, within the regulator body member 10, terminates in an intake nozzle 22 having a relatively fine bore 23, the inner end 24 of said nozzle constituting a valve seat with which the valve mechanism, to be later described, cooperates.

A pressure gage E for indicating the pressure in the pressure chamber 25, is screw-threaded into the body member 10, as indicated at 26, and a tubular discharge connection 27, with which the flow line D connects, is screw-threaded into the body member 10, as indicated at 28.

With particular reference to Fig. 4 of the drawings, it will be noted that there is a pressure-responsive means in the form of a diaphragm 29 having its peripheral portion clamped between the body member 10 and the bonnet 13 by the screws 14. This diaphragm, which may be made of a suitable metal or other material, forms a closure for the pressure chamber 25 and carries a connecting means in the form of a centrally disposed depending center pin or actuating stud 30 which has an annular flange 31 engaging the inner surface of the diaphragm and a screw-threaded end 32 extending through a central aperture in said diaphragm. Surrounding the end 32 of the stud 30 and engaging the outer surface of the diaphragm, is a cup-shaped spring retainer 33, said stud and retainer being clamped to the diaphragm by a nut 34 having a screw-threaded engagement on said end 32 of the stud 30.

Arranged to slide upon the nozzle 22 is a cup-valve 35 having a series of circularly spaced outlet ports 36 formed in its body portion and affording communication between the interior of said valve and the pressure chamber 25, and provided with an annular flange 37 projecting outwardly from said body portion. Seated in the base of the bore of said cup-valve is a valve disc 38, preferably formed of hard rubber or other similar substance, this valve disc cooperating with the valve seat 24 at the end of the nozzle 22 to control the flow of gas into the pressure chamber 25.

To convert the vertical movement (when the regulator is in an upright position as viewed in Fig. 4) of the diaphragm 29 to a horizontal movement of the valve 35, a toggle member 39 is employed. In the preferred construction, this toggle member is formed of flat spring metal and has one end bifurcated so that each furcation 40 thereof may extend upon an opposite side of the body portion of the cup-valve 35 and engage in a notch 41 formed in the surface of the flange 37, the opposite end of said toggle spring being pointed to engage in a retaining notch 42 formed in the side wall of the regulator body member 10, (see Fig. 3).

The free end 43 of the diaphragm stud 30 is preferably flattened and extends through a central aperture 44 formed in the toggle spring 39 and has a freely slidable connection with said toggle spring, this connection comprising a split cotter-pin positioned with its limbs 45, 45a on opposite sides of the toggle spring 39 and extending through an aperture 46 in the free end 43 of the stud 30, as shown in detail in Fig. 5. The toggle spring 39, the stud 30, and the parts associated therewith constitute the motion-transmitting means of our invention.

By this arrangement the stud 30 has a free sliding connection with the toggle spring 39 so as to eliminate transmission of such side thrusts as would tend to cock the diaphragm and to permit a self-centering of the diaphragm and stud at all times.

Within the bonnet 13 and seated in the cup-shaped retainer 33 is a regulating means in the form of a pressure regulating spring 47 having a disc 48 seated upon its outer end and engaged by an adjusting screw 49 screw-threaded into the outer end of the bonnet, said bonnet having openings 50 to permit passage of air into and out of the bonnet so as to prevent compression of the air above the diaphragm.

When the parts are in normal position, as shown in Fig. 4, and before the spring 47 has been adjusted to apply power to the diaphragm, the inherent tension of the bowed toggle spring 39 is sufficient to maintain the valve 35, closed.

Considering the apparatus connected to the gas cylinder and to the flow line, as shown in Fig. 1, and assuming the flow line as leading to a torch, the regulating screw 49 will be adjusted to apply pressure to the diaphragm so as to cause an opening of the inlet valve 35. Gas will thus be permitted to flow from the compressed gas cylinder, through the nozzle 22, past the valve seat 38, through the outlet ports 36, and into the pressure chamber 25, and assuming the torch to be shut off, the gas will build up a pressure in said chamber until such pressure, exerting its energy on the inner surface of the diaphragm, is sufficient to overcome the applied energy of the regulating spring and effect a closing of the valve 35, the pressure gage E indicating the pressure to which the device is adjusted.

After the proper adjustment is made, the torch may be put in use, the regulator automatically functioning to open and close the valve 35 in proportion to the amount of gas used by the torch so as to at all times maintain a constant pressure in the pressure chamber and flow line. It will be evident that the regulator will maintain the pressure constant in exact proportion to the promptness with which the mechanism responds to the fluctuations in the amount of gas used, that is, the mechanism must be ultra-sensitive in order to provide a regulator of high efficiency, and not only must the regulator maintain an even pressure when the torch is in use but it must promptly close the valve 35 when the torch pops or is shut off, or in case of obstruction in the flow line, and when the torch is again turned on or the obstruction removed, the mechanism must be promptly responsive to again open the valve 35 to its precise former position.

These results are accomplished by the ultra-sensitive mechanism of the present invention by reason of the particular toggle arrangement which multiplies the power transmitted from the diaphragm to the inlet valve 35. This multiplication of power is accompanied by an increased movement of the diaphragm in relation to the movement of the valve 35, therefore, as an appreciable movement of the diaphragm equals only a very slight movement of the valve, it will be evident that if this ratio is, for instance, 1 to 7, the regulator herein disclosed will be seven times as sensitive as the ordinary type of regulator having an aligned diaphragm and valve secured together and moving in unison.

A very important feature of the invention is that the toggle spring 39 is straightened by the diaphragm 29 in order to close the valve 40. As the valve 40 moves towards closed position its motion is gradually slowed, and the force applied to the valve by the toggle spring gradually increases. This arrangement provides an extremely sensitive regulator which delivers the gas through the part 15 at a reliably uniform pressure. The toggle spring, when the regulator is at rest, is bowed as illustrated in the drawings, so that it yieldably maintains the valve 40 in closed position.

Another important feature of the invention is that the toggle spring 39 is controlled in its operation by means of the diaphragm 29 against which the pressure is exerted by the spring 47. The toggle spring 39, therefore, upon its initial installation, may be properly adjusted and to obtain different reductions in pressure it is only necessary to regulate the adjustment screw 49, which controls the pressure which the spring 40 exerts onto the diaphragm 29.

To further promote the sensitiveness of the device and to guard against injury to the nozzle valve seat 24 by scale, rust or other grit present in the gas, the nozzle 22 is plated with a hard smooth material, preferably chromium, as indicated at 51 in Fig. 7.

In pressure regulators which are designed for use for cutting torches as well as for use for welding torches, it is necessary to arrange the mechanism so as to be adjusted for a low pressure range up to 15 pounds pressure for welding, and also so as to be capable for adjustment for a high pressure range from 25 to 150 pounds pressure for cutting.

A single uniform spring to cover these ranges would be entirely impractical and for this reason it has heretofore been the general practice to provide two springs, one inside the other, the weaker inner spring to cover the lower range of welding pressures and the outer stronger spring to cover the higher range of cutting pressures, the outer spring being inoperative during the welding operations.

This double spring arrangement is costly and, besides, it includes a greater number of parts to get out of order.

In Fig. 6, I have disclosed a single compound spring which will be effective over both the low and high pressure ranges and which may be very economically produced. This spring 47a is a multiple pitch spring in which the upper coils 47b are wound to a relatively small pitch while the lower coils 47c are wound to a relatively large pitch. As it is well known that coil springs of equal diameter and wire area exert a power proportionate to the pitch of their coils, it will be evident that the upper portion of the spring 47a will be weaker and more sensitive than the lower portion. This strength proportion is such that only the upper weaker portion will be active through the welding range and until the upper portion contacts coil on coil, after which the stronger portion will become active to function through the cutting range.

From the above description it will be apparent that the present invention provides an ultrasensitive pressure regulator in which all appreciable sympathetic vibrations of the diaphragm have been eliminated and in which the toggle arrangement produces a multiplication of the force transmitted from the diaphragm to the valve.

While the preferred form of embodiment herein illustrated and described is well adapted to fulfill all of the objects primarily stated, it is to be understood that I do not wish to limit the invention in this regard, for it is susceptible of embodiment in various other forms, all coming within the scope of the claims which follow.

We claim as our invention:

1. In a pressure regulator, the combination of: a body forming a pressure chamber and having an inlet and an outlet; a diaphragm forming a wall of said chamber and having a central stud extending into said chamber; a valve for said inlet having an operating movement in a plane at right angles to the axis of said diaphragm; means for applying a predetermined pressure to the outer surface of said diaphragm; and a single toggle member directly connected to said stud, valve and body for transmitting the movements of said diaphragm to said valve, said toggle member having a free sliding connection with said stud to permit a self-centering of said stud and the diaphragm and functioning to reduce the movements and increase the power transmitted thereby.

2. In a pressure regulator, the combination of: a body forming a pressure chamber having an outlet; a diaphragm forming a wall of said chamber and having a central stud extending into said chamber; means for applying a predetermined pressure to the outer surface of said diaphragm; an inlet nozzle extending into said chamber in a plane at right angles to the axis of said stud and forming a valve seat; a valve slidable on said nozzle; and a single toggle member associated with said stud and having its ends connected to said valve and said body for transmitting the movements of said diaphragm and said stud to said valve, said toggle member having a free sliding connection with said stud to permit a self-centering of said stud and diaphragm and functioning to reduce the movements and increase the power transmitted thereby.

3. In a pressure regulator, the combination of: a body forming a pressure chamber and having an inlet and an outlet; a diaphragm forming a wall of said chamber and having a central stud extending into said chamber; a valve for said inlet having an operating movement in a plane at right angles to the axis of said diaphragm; means for applying a predetermined pressure to the outer surface of said diaphragm; and a single bowed leaf-spring toggle member for transmitting the movements of said diaphragm stud to said valve and functioning to reduce the movements and increase the force transmitted thereby, one end of said toggle member engaging said valve and its other end engaging the body, and the stud having a free sliding connection with the medial portion of said toggle member to permit a self-centering of the stud and diaphragm.

4. A combination as defined in claim 3 in which the free end of said stud extends through an aperture in said toggle member and in which said sliding connection comprises a split cotter pin having its limbs extending on opposite sides of said toggle member and through a transverse opening in said stud.

5. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member; a one-piece toggle-spring, one end directly engaging said valve and the other end engaging said walls forming said pressure chamber; and connecting means operatively connecting said toggle-spring and said pressure-responsive member, said connecting means permitting a sliding adjustment of said pressure-responsive member and toggle-spring in a plane perpendicular to the plane of movement of said pressure-responsive member.

6. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member; a one-piece toggle-spring, one end directly engaging said valve and the other end pivotally engaging said walls forming said pressure chamber; and connecting means operatively connecting said toggle-spring and said pressure-responsive member, said connecting means permitting a sliding adjustment of said pressure-responsive member and toggle-spring in a plane perpendicular to the plane of movement of said pressure-responsive member.

7. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member; a one-piece toggle-spring, one end directly engaging said valve and the other end engaging said walls forming said pressure chamber, said toggle-spring being bowed by compression so that said toggle-spring yieldingly tends to hold said valve in closed position; and connecting means operatively connecting said toggle-spring and said pressure-responsive member, said connecting means permitting a sliding adjustment of said pressure-responsive member and toggle-spring in a plane perpendicular to the plane of movement of said pressure-responsive member.

8. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member; a one-piece toggle-spring, one end directly engaging said valve and the other end pivotally engaging said walls forming said pressure chamber, said toggle-spring being bowed by compression so that said toggle-spring yieldingly tends to hold said valve in closed position; and connecting means operatively connecting said toggle-spring and said pressure-responsive member, said connecting means permitting a sliding adjustment of said pressure-responsive member and toggle-spring in a plane perpendicular to the plane of movement of said pressure-responsive member.

9. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member, said valve having a flange extending outwardly therefrom; a one-piece toggle-spring, one end of said toggle-spring being bifurcated, said furcations extending on opposite sides of said valve and engaging said flange, and the other end engaging said walls forming said pressure chamber; and connecting means operatively connecting said toggle-spring and said pressure-responsive member.

10. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member, said valve having a flange extending outwardly therefrom; a one-piece toggle-spring, one end of said toggle-spring being bifurcated, said furcations extending on opposite sides of said valve and engaging said flange, and the other end pivotally engaging said walls forming said pressure chamber; and connecting means operatively connecting said toggle-spring and said pressure-responsive member.

11. In a pressure regulator, the combination of: walls forming a pressure chamber, and an inlet and an outlet therefor; a pressure-responsive member forming a wall for said pressure chamber; regulating means for exerting a force on said pressure-responsive member; a valve for said inlet, said valve being movable to open and close said inlet in a plane at an angle to the movement of said pressure-responsive member, said valve having a flange extending outwardly therefrom; a one-piece toggle-spring, one end of said toggle-spring being bifurcated, said furcations extending on opposite sides of said valve and pivotally engaging said flange, and the other end pivotally engaging said walls forming said pressure chamber; and connecting means operatively connecting said toggle-spring and said pressure-responsive member.

12. In a pressure regulator, the combination of: a body forming a pressure chamber and having an outlet; a diaphragm forming a wall of said chamber and having a central stud extending into said chamber; means for applying a predetermined pressure to the outer surface of said diaphragm; an inlet nozzle extending into said chamber in a plane at right angles to the axis of said stud and forming a valve seat; a cup valve slidable on said nozzle and having a flange extending outwardly from its body portion, said body portion being provided with outlet ports communicating with the valve bore and with said pressure chamber; and a single bowed leaf-spring toggle member for transmitting the movements of said diaphragm to said valve and functioning to reduce the movements and increase the force transmitted thereby, one end of said toggle member being bifurcated with its furcations extending on opposite sides of the valve and engaging the flange thereof and its other end engaging said body, and the stud having a free sliding connection with the medial portion of said toggle member to permit a self-centering of the stud and diaphragm.

13. In a pressure regulator, the combination of: a body forming a pressure chamber having an outlet; a diaphragm forming a wall of said chamber and having a central stud extending into said chamber; means for applying predetermined pressure to the outer surface of said diaphragm; an inlet nozzle extending into said chamber in a plane at right angles to the axis of said stud and forming a valve seat; a cup-valve slidable over the end of said nozzle and having outlet ports in its side walls communicating with its bore and with said pressure chamber; and a single bowed leaf-spring toggle member for transmitting the movements of said diaphragm to said valve and functioning to reduce the movements and increase the force transmitted thereby, one end of said toggle member engaging said valve and its other end engaging said body, and the stud having a free sliding connection with the medial portion of said toggle member to permit a self-centering of the stud and diaphragm.

CHESTER MOTT.
GERALD G. SPENCER.